(12) United States Patent
Kim et al.

(10) Patent No.: US 7,868,532 B2
(45) Date of Patent: Jan. 11, 2011

(54) LIGHT EMISSION DEVICE AND DISPLAY DEVICE PROVIDED WITH THE SAME

(75) Inventors: Jae-Myung Kim, Yongin-si (KR); Hee-Sung Moon, Yongin-si (KR); Yoon-Jin Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 768 days.

(21) Appl. No.: 11/773,088

(22) Filed: Jul. 3, 2007

(65) Prior Publication Data

US 2008/0252192 A1 Oct. 16, 2008

(30) Foreign Application Priority Data

Apr. 11, 2007 (KR) ...................... 10-2007-0035595

(51) Int. Cl.
  *H01J 1/62* (2006.01)
(52) U.S. Cl. ........................................ 313/495; 428/408
(58) Field of Classification Search ................... 174/98; 313/495; 345/102; 428/336; 524/496
  See application file for complete search history.

(56) References Cited

U.S. PATENT DOCUMENTS

| | | | |
|---|---|---|---|
| 2004/0009346 A1* | 1/2004 | Jang et al. | 428/336 |
| 2005/0228110 A1* | 10/2005 | Ko et al. | 524/496 |
| 2007/0057619 A1* | 3/2007 | Chou et al. | 313/495 |
| 2007/0268240 A1* | 11/2007 | Lee et al. | 345/102 |
| 2008/0283269 A1* | 11/2008 | Graham et al. | 174/98 |

FOREIGN PATENT DOCUMENTS

| | | |
|---|---|---|
| KR | 2001-51709 | 6/2001 |
| KR | 2006-130485 | 12/2006 |
| KR | 2007-5971 | 1/2007 |

* cited by examiner

*Primary Examiner*—Nimeshkumar D Patel
*Assistant Examiner*—Mary Ellen Bowman
(74) *Attorney, Agent, or Firm*—Christie, Parker & Hale, LLP

(57) ABSTRACT

A light emission device includes first and second substrates opposing each other to form a vacuum vessel, an electron emission unit located on the first substrate, a light emission unit located on the second substrate and emitting visible light in response to electrons emitted from the electron emission unit, and a heat dissipating sheet located on an outer surface of the second substrate. The heat dissipating sheet includes carbon nanotubes. A display device includes the light emission device, and a panel assembly located in front of the light emission device to transmit therethrough the light emitted from the light emission device to display images.

15 Claims, 4 Drawing Sheets

LIGHT EMISSION DEVICE AND DISPLAY DEVICE PROVIDED WITH THE SAME

CROSS-REFERENCE TO RELATED APPLICATIONS

This application claims the benefit of Korean Patent Application No. 2007-35595, filed Apr. 11, 2007, in the Korean Intellectual Property Office, the disclosure of which is incorporated herein by reference.

BACKGROUND OF THE INVENTION

1. Field of the Invention

Aspects of the present invention relate to a light emission device in which the light emission device has a cooling structure to protect the light emission device from heat and a display device including the same.

2. Description of the Related Art

Liquid crystal displays (LCDs) are experiencing increasingly widespread use as they replace displays based on cathode ray tube technology. The LCD utilizes the dielectric anisotropy properties of liquid crystals that change their twisting angle depending on the voltage applied thereto so as to vary the amount of light transmission for each pixel.

The LCD is a non-emissive display that displays images through use of an external light source. The LCD includes a liquid crystal panel assembly and a backlight unit for supplying light to the LCD. The LCD assembly receives light emitted from the backlight unit, and, by utilizing the operation of a liquid crystal layer, either transmits or blocks the light to thereby realize the display of predetermined images.

SUMMARY OF THE INVENTION

Exemplary embodiments in accordance with the present invention provide a light emission device in which the light emission device is able to effectively disperse heat concentrated on a substrate and a display device provided with the same.

Exemplary embodiments in accordance with the present invention also provide a light emission device and a display device provided with the same, in which a light emission surface of the light emission device is divided into a plurality of regions, and light emission intensities of the divided regions are able to be independently controlled such that a dynamic contrast ratio of a screen may be realized and enhanced.

In an exemplary embodiment of the present invention, a light emission device includes: first and second substrates opposing each other to form a vacuum vessel; an electron emission unit located on the first substrate; a light emission unit located on the second substrate and emitting visible light in response to electrons emitted from the electron emission unit; and a heat dissipating sheet located on an outer surface of the second substrate. The heat dissipating sheet includes carbon nanotubes.

The heat dissipating sheet further includes a transparent polymer in which the carbon nanotubes are dispersed. The transparent polymer is selected from the group consisting of a polyacrylate, a polyethylene, a polyethylene terephthalate, and a polychloride (PC), or a combination thereof. The carbon nanotubes respectively have a diameter between 1 and 100 nm. The heat dissipating sheet has a transparency of 10% or greater.

The light emission device further includes a cooling plate located on a bottom surface of the first substrate, the heat dissipating sheet being connected to the cooling plate. The heat dissipating sheet is in the form of a film that may be adhered to the second substrate, or is coated on the second substrate.

The electron emission unit includes first electrodes formed to extend in a first direction; second electrodes formed to extend in a second direction. Also, the first electrodes are insulated from the second electrodes, and the first and second directions intersect. Further, the light emission device includes electron emission regions electrically connected to the first electrodes or the second electrodes.

A display device according to an exemplary embodiment of the present invention includes: a light emission device as described above; and a panel assembly located in front of the light emission device to thereby receive the light emitted from the light emission device to display images. The panel assembly includes first pixels and the light emission device includes second pixels. A number of the second pixels is less than a number of the first pixels. The second pixels respectively emit different intensities of light.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
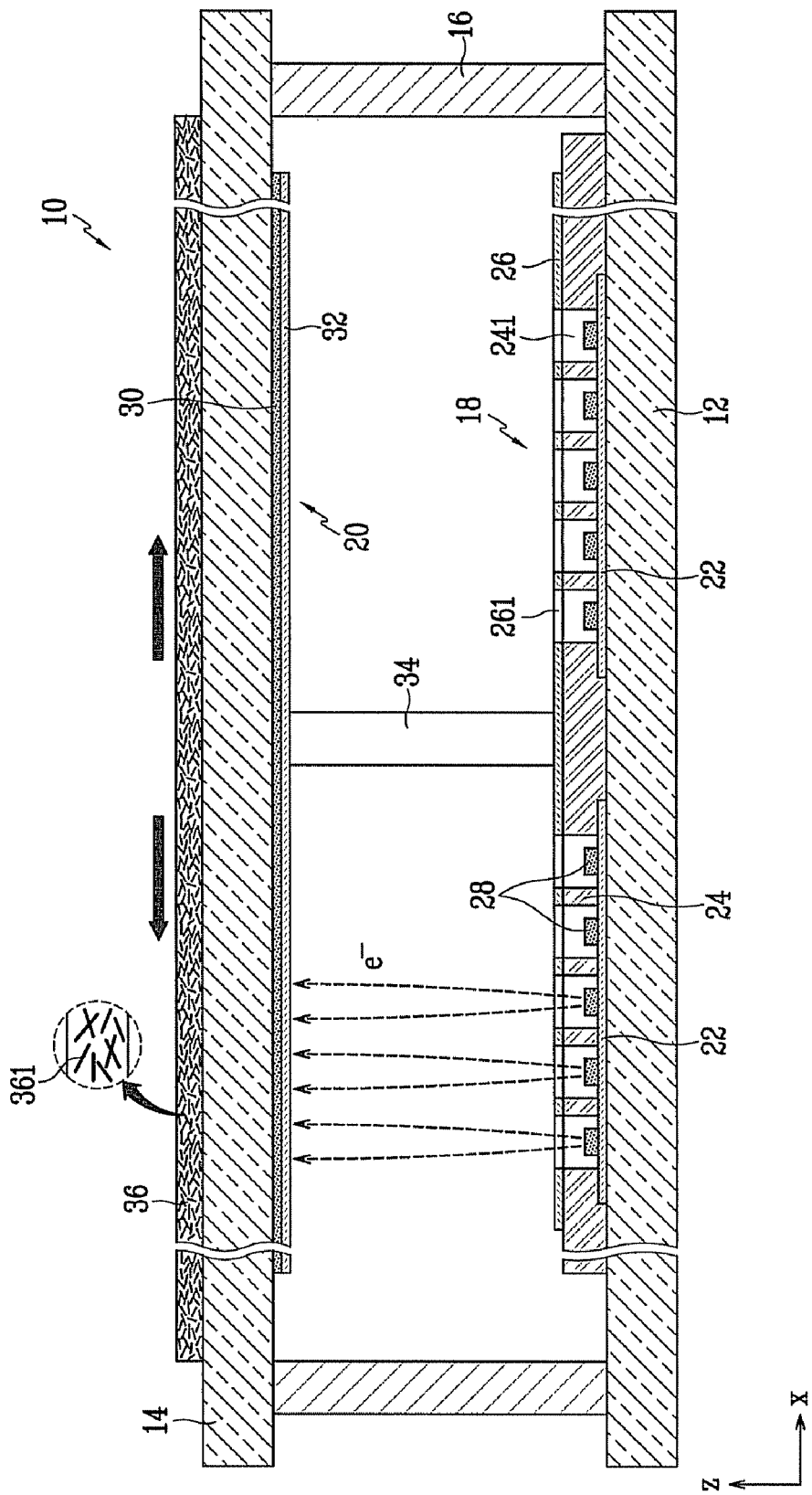
FIG. 1 is a partial cross-sectional view of a light emission device according to an exemplary embodiment of the present invention.

Reference will now be made in detail to the exemplary embodiments of the present invention, examples of which are illustrated in the accompanying drawings, wherein like reference numerals refer to the like elements throughout. The exemplary embodiments are described below in order to explain aspects of the present invention by referring to the figures. Aspects of the present invention may, however, be embodied in different forms and should not be construed as limited to the embodiments set forth herein. When it is mentioned that a layer or an electrode is said to be "disposed on" or "formed on" another layer or a substrate, the phrase means that the layer or electrode may be directly formed on the other layer or substrate, or that a third layer may be disposed therebetween. In addition, the thickness of layers and regions may be exaggerated for clarity.

Figure 2:
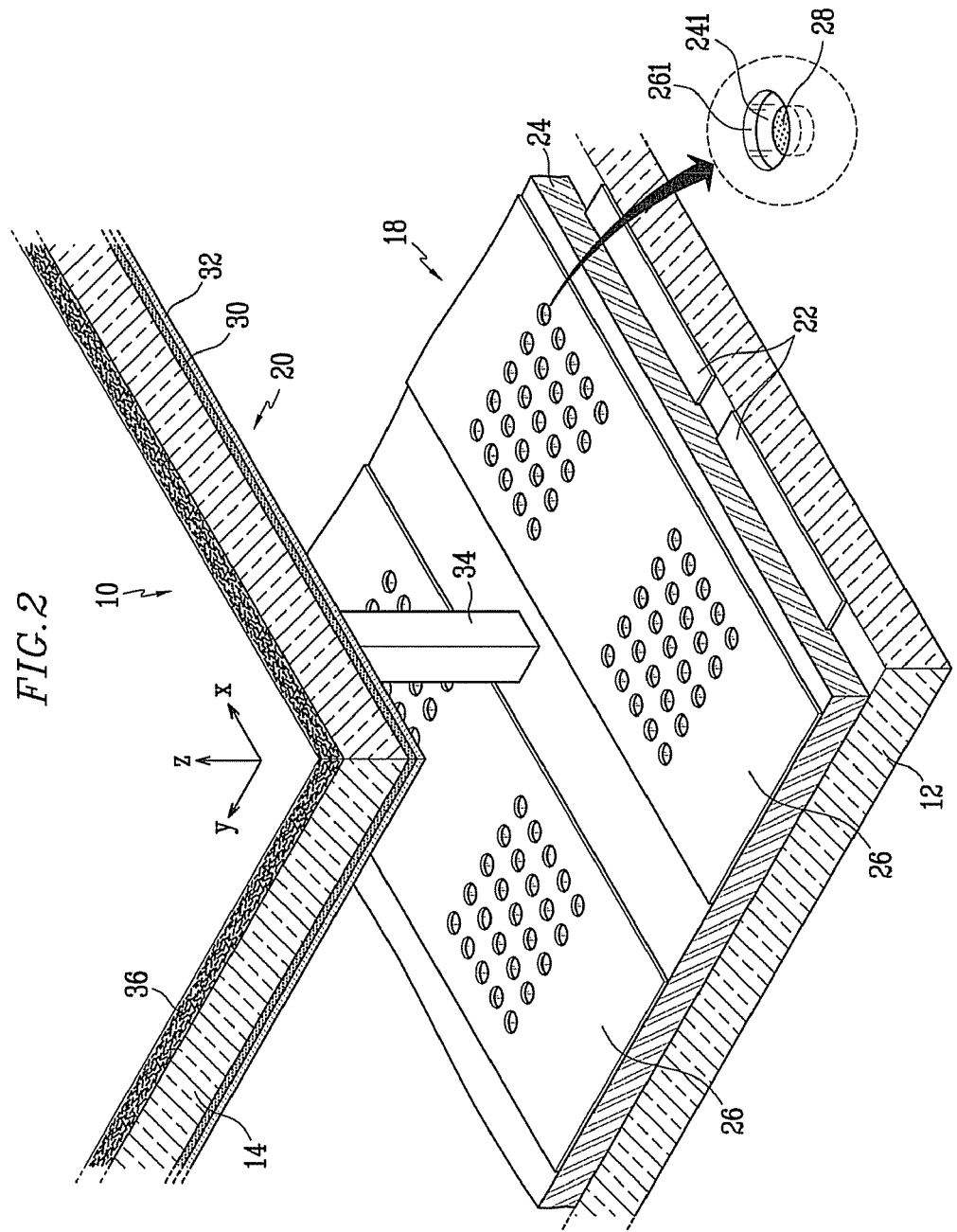
FIG. 2 is a partial perspective view of the light emission device of FIG. 1.

FIG. 1 is a partial cross-sectional view of a light emission device according to an exemplary embodiment of the present invention, and FIG. 2 is a partial perspective view of the light emission device of FIG. 1.

Referring to FIGS. 1 and 2, a light emission device 10 according to this exemplary embodiment of the present invention includes a first substrate 12 and a second substrate 14 provided opposing each other in a substantially parallel arrangement and with a predetermined gap therebetween. A sealing member 16 is provided between the first and second substrates 12 and 14 along edge portions thereof to seal together the first and second substrates 12 and 14 and thus form a vacuum vessel. The interior of the vacuum vessel is kept to a degree of vacuum of about 10-6 Torr, or the vessel is kept at an absolute pressure of about 750 to 754 Torr.

Each of the first and second substrates 12 and 14 is divided by the sealing member 16 into an active area that contributes to the emission of visible light, and an inactive area surrounding the active area and from which visible light is not emitted. An electron emission unit 18 that emits electrons e⁻ is formed on the first substrate 12 in the active area thereof, and a light emission unit 20 that emits visible light when excited by the electrons e⁻ emitted from the electron emission unit 18 is formed on the second substrate 14 in the active area thereof.

The electron emission unit 18 includes first electrodes 22 and second electrodes 26 respectively formed in a stripe pattern. An insulation layer 24 is disposed between the first and second electrodes 22 and 26 to insulate the first and second electrodes 22 and 26 from each other. As illustrated in FIG. 2, the first electrodes 22 are formed along a first direction (the direction of the Y-axis), while the second electrodes 26 are formed along a second direction (the direction of the X-axis) that is substantially perpendicular to the first direction (Y-axis). Although the first and second electrodes 22 and 26 are illustrated as being substantially perpendicular, the first and second electrodes 22 and 26 need only cross or intersect so as to define a single pixel region to be selected for electron emission.

The electron emission unit 18 further includes electron emission regions 28 which are electrically connected to the first electrodes 22 or the second electrodes 26. When the electron emission regions 28 are formed on the first electrodes 22, the first electrodes 22 function as cathodes to supply current to the electron emission regions 28, and the second electrodes 26 function as gate electrodes. In contrast, if the electron emission regions 28 are formed on or electrically connected to the second electrodes 26, the second electrodes 26 function as cathode electrodes, while the first electrodes 22 function as gate electrodes. A voltage difference or voltage potential is applied to the first and second electrodes 22 and 26 to create an electric field and induce electron emission from the electron emission regions 28.

One of the first and second electrodes 22 and 26, e.g., the second electrodes 26 extending in the second direction (X-axis in FIG. 2) of the light emission device 10, function as scan electrodes, and the other of the first and second electrodes 22 and 26, e.g., the first electrodes 22 extending in the first direction of the light emission device 10 (Y-axis in FIG. 2), function as data electrodes. The second direction corresponding to the X-axis in FIG. 2 may be described as a row direction while the first direction corresponding to the Y-axis may be described as a column direction.

In the drawings, the electron emission regions 28 are formed on the first electrodes 22, and the first electrodes 22 are formed along the column direction of the light emission device 10. However, the electron emission regions 28 and the first and second electrodes 22 and 26 are not limited with respect to the positioning of the electron emission regions 28, nor with respect to the arrangement of the first and second electrodes 22 and 26, and various other configurations may be employed.

Openings 261 and openings 241 are respectively formed in the second electrodes 26 and the insulation layer 24. The openings 261 and 241 correspond to the location in which the first and second electrodes 22 and 26 intersect or cross and expose portions of surfaces of the first electrodes 22. The electron emission regions 28 are positioned on the first electrodes 22 (i.e., on these exposed portions) respectively within the openings 241 in the insulation layer 24. An electron emission region 28 disposed in the openings 261 and 241 is shown in detail in FIG. 2.

The electron emission regions 28 are formed of a material that emits electrons e⁻ when an electric field and a vacuum are applied thereto. The electron emission regions 28 may be formed of materials such as a carbon-based material or a nanometer-sized material. For example, the electron emission regions 28 may be formed of carbon nanotubes, graphite, graphite nanofibers, diamonds, diamond-like carbon, fullerenes such as $C_{60}$, silicon nanowires, or a combination thereof. As to the method of forming the electron emission regions 28, a screen-printing method, a direct growth method, a chemical vapor deposition method, or a sputtering method may be used.

The electron emission regions 28 are gathered at a central portion of each intersecting or crossing region or a central portion of the openings 261 and 241 rather than a periphery of the intersecting or crossing region in consideration of the electron beam divergence characteristics of the electron emission regions 28.

In the above-described structure, areas corresponding to where the first and second electrodes 22 and 26 intersect or cross each other correspond to a single pixel region of the light emission device 10. However, two or more of the intersecting or crossing regions may correspond to a single pixel region, in which case two or more of the first electrodes 22 or the second electrodes 26 corresponding to a single pixel region may be electrically connected to receive a common driving voltage to display a common gray scale.

As illustrated in FIG. 2, the light emission unit 20 includes a phosphor layer 30, and an anode electrode 32 formed on a surface of the phosphor layer 30. The phosphor layer 30 is disposed on a surface of the second substrate 14 between the first substrate 12 and the second substrate 14. Further, the phosphor layer 30 is disposed on the surface of the second substrate 14 between the second substrate 14 and the anode electrode 32. The phosphor layer 30 may be formed of a white phosphor layer, or may be formed through a structure in which red, green, and blue phosphor layers are combined. The red, green, and blue phosphor layers may be arranged to appear to form a white display, combined to form a white display, or combined to display an image. The phosphor layer 30 as illustrated in the drawings comprises a white phosphor layer.

The phosphor layer 30 may be formed on an entire area of the second substrate 14, or may be formed in a predetermined pattern in which a plurality of the phosphor layers 30 are positioned respectively corresponding to the pixel regions. When the phosphor layer 30 comprises red, green, and blue phosphor layers, the phosphor layer 30 may be formed in a predetermined pattern for each of the pixel regions.

The anode electrode 32 may be formed of a metal layer such as an aluminum (Al) layer covering the phosphor layer 30. As the anode electrode 32 can be formed of a metal with high conductivity, efficiency of the light emission device 10 can be improved. The anode electrode 32 is an acceleration electrode that receives a high voltage to maintain the phosphor layer 30 at a high electric potential so as to attract electrons e⁻ emitted from the electron emission regions 28. The anode electrode 32 also functions to enhance luminance by reflecting visible light. That is, visible light that is emitted from the phosphor layer 30 toward the first substrate 12 is reflected by the anode electrode 32 toward the second substrate 14.

Spacers 34 are disposed between the first and second substrates 12 and 14 to enable the first and second substrates 12 and 14 to withstand compression forces resulting from the light emission device 10 being under vacuum or formed as a vacuum vessel. The spacers 34 are located at positions outside the intersection or crossing areas of the first and second electrodes 22 and 26, e.g., between the second electrodes 26. The spacers 34 may be made of, for example, glass or ceramic.

A heat dissipating sheet 36 is adhered to an upper surface of the second substrate 14. The heat dissipating sheet 36 is disposed on the upper surface of the second substrate 14 or otherwise described as a surface of the second substrate 14 opposite the first substrate 12 such that the second substrate 14 is between the heat dissipating sheet 36 and the first substrate 12. The heat dissipating sheet 36 disperses heat concentrated at a center portion of the second substrate 14 outwardly in a direction away from the second substrate 14. The heat dissipating sheet 36 allows for the transmission of visible light that is emitted from the phosphor layer 30. The heat dissipating sheet 36 includes a transparent polymer to allow for the transmission of light therethrough, and includes carbon nanotubes 361 for the purpose of heat transmission. For example, the heat dissipating sheet 36 may be realized by dispersing the carbon nanotubes 361 in the transparent polymer. The transparent polymer may be a polyacrylate, a polyethylene (PE), a polyethylene terephthalate (PET), a polychloride (PC), or a combination thereof. The carbon nanotubes 361 may be single-walled nanotubes or multi-walled nanotubes respectively having a diameter between 1 and 100 nm. Preferably, the carbon nanotubes 361 are realized using single-walled nanotubes as they possess excellent heat-transmission characteristics. Further, the carbon nanotubes 361 may be located in the transparent polymer with their long axes approximately aligned with a lengthwise direction of the heat dissipating sheet 36, i.e., aligned with the second direction (the X-axis, to thereby increase heat dissipation.

The carbon nanotubes 361 dispersed in the heat dissipating sheet 36 may also act to scatter light emitted from the phosphor layer 30. As a result, when the light emission device 10 is used as a backlight, a separate diffusion plate is unneeded. The heat dissipating sheet 36 has a transparency of 10% or greater to allow for the transmission of light therethrough. Further, the heat dissipating sheet 36 may be formed of a film to allow for attachment to the upper surface of the second substrate 14, or may be coated on the upper surface of the second substrate 14 using a device such as a spin coater.

The above-described light emission device 10 is driven by applying predetermined external driving voltages to the first electrodes 22 and the second electrodes 26, and a direct current voltage of several thousand to tens of thousands of volts to the anode electrode 32.

As a result, electric fields are formed around the electron emission regions 28 at the pixels where the voltage difference between the first and second electrodes 22 and 26 is greater than or equal to a threshold value, and thus electrons e⁻ are emitted from the electron emission regions 28. The emitted electrons are attracted by the anode voltage applied to the anode electrode 32 to collide with corresponding areas of the phosphor layer 30 to cause the phosphor layer 30 to emit light. The emission intensity of the phosphor layer 30 for each of the pixels corresponds to the amount of electron beam emission of the electron emission regions 28 corresponding to the pixels.

During the driving process, heat emitted from the phosphor layer 30 and the anode electrode 32 is transmitted to the second substrate 14. This transmitted heat is then dispersed outwardly of the light emission device 10 through the heat dissipating sheet 36. Accordingly, the heat dissipating sheet 36 increases the uniformity of the temperature distribution over the entire area of the second substrate 14.

Table 1 shows the temperature distributions of the second substrate 14 for the light emission device 10 and for a second substrate of a light emission device not including the heat dissipating sheet 36. For the Exemplary Example, the heat dissipating sheet 36 was formed using a transparent polymer in which carbon nanotubes were dispersed. The transparent polymer was a polyacrylate. The light emission devices were 15-inch light emission devices.

TABLE 1

|  | Center temperature (° C.) | Peripheral temperature (° C.) | Temperature difference (%) |
| --- | --- | --- | --- |
| Comparative Example | 70 | 40 | 175 |
| Exemplary Example | 55 | 50 | 110 |

As shown in Table 1, the center portion of the second substrate for the Comparative Example light emission device that did not include a heat dissipating sheet increased to a temperature of 70° C., and the peripheral temperature for the Comparative Example light emission device only increased to 40° C. The center portion of the Comparative Example light emission device exhibited a temperature that was 175% greater than the temperature of the peripheral portion. However, the center portion of the substrate for the Exemplary Embodiment light emission device 10 that included the heat dissipating sheet 36 disposed on the second substrate 14 reached 55° C. while the peripheral temperature was 50° C. Thus, the center portion of the Exemplary Embodiment light emission device 10 was only 110% greater than the peripheral temperature. In the case of the Exemplary Example, there is almost no temperature difference between the center portion and peripheral portion of the second substrate. The temperature difference percentage at this time refers to the ratio of the temperature of the center portion to the temperature of the peripheral portion in terms of percent (i.e., multiplied by 100).

In the light emission device 10 of the above exemplary embodiment, a high voltage of 10 kV or higher, preferably 10 to 15 kV, is applied to the anode electrode 32 through anode pad regions (not shown) to allow for a maximum brightness of 10,000 cd/m². Accordingly, in the light emission device 10 of this embodiment, the gap between the first and second substrates 12 and 14 is between 5 and 20 mm to prevent electrical instability (e.g., short circuiting) due to the application of such a high voltage.

Figure 3:
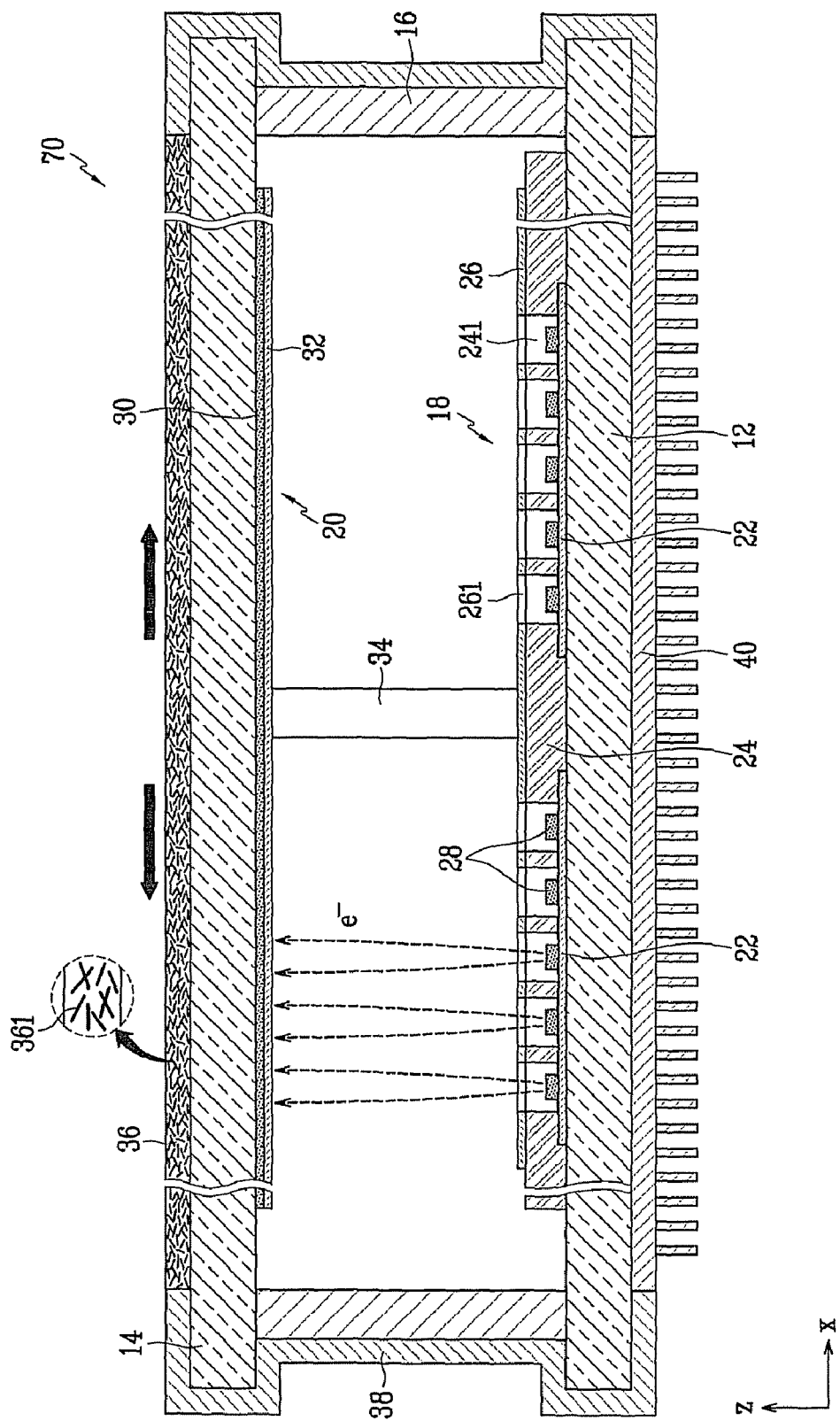
FIG. 3 is a partial cross-sectional view of a light emission device according to another exemplary embodiment of the present invention.

FIG. 3 is a partial cross-sectional view of a light emission device 70 according to another exemplary embodiment of the present invention. Referring to FIG. 3, a light emission device 70 according to this exemplary embodiment of the present invention is substantially the same as the light emission device 10 of the above exemplary embodiment, and as such, similar elements will not be discussed in connection to FIG. 3. However, in this exemplary embodiment, the light emission device 70 further includes a cooling plate 40 located on a bottom surface of the first substrate 12. The cooling plate 40 is connected to the heat dissipating sheet 36 through conductive connectors 38. The conductive connectors 38 extend from the lower surface to the upper surface (or from the rear to the front or from the rearward direction to the forward direction) of the light emission device 70. The conductive connectors 38 may extend so as to contact the entire inactive area and surfaces of the sealing members 16 that are in the inactive area of the light emission device 70. However, the conductive connectors 38 are not limited thereto. The conductive connectors 38 may also provide for channels to be formed between the sealing members and the conductive connectors 38 to allow for air to flow therethrough. Accordingly, heat generated in the second substrate 14 is discharged outwardly from the light emission device 70 through the heat dissipating sheet 36, the conductive connectors 38, and the cooling plate 40. The heat dissipating sheet 36 includes carbon nanotubes 361, which are substantially aligned in the second direction or the direction of the X-axis. The cooling plate 40 is shown as having protrusions or cooling fins extending therefrom; however, the cooling plate 40 is not limited thereto. The cooling plate 40 may include cooling channels that are formed to extend through the cooling plate 40 so that air may flow therethrough. Further, the conductive connectors 38 may include cooling fins similar to the cooling plate 40. The cooling plate 40 and the conductive connectors 38 may be formed of any conductive material that efficiently dissipates heat from the light emission device 70 and may comprise the same materials as the heat dissipating sheet 36.

Figure 4:
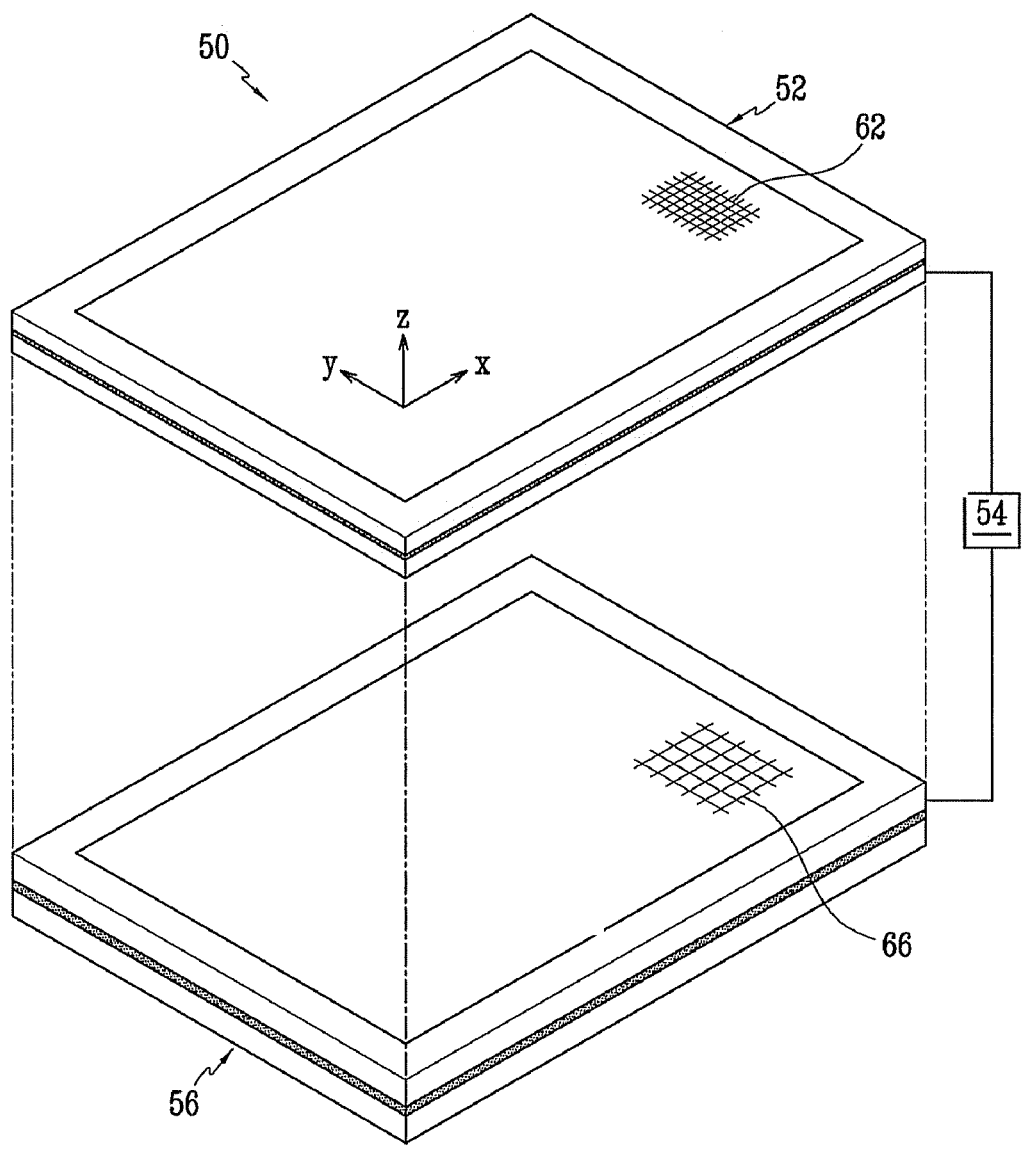
FIG. 4 is an exploded perspective view of a display device according to an exemplary embodiment of the present invention.

FIG. 4 is an exploded perspective view of a display device according to an exemplary embodiment of the present invention. Referring to FIG. 4, a display device 50 according to this exemplary embodiment includes a panel assembly 52 including a plurality of pixels along rows and columns, and a light emission device (e.g., the light emission devices 10 and 70 as described above) located rearwardly of the panel assembly 52 and that supplies light to the panel assembly 52. The light emission device will be hereinafter referred to as a backlight unit 56.

For the panel assembly 52, any known configuration may be employed. Optical elements (e.g., a transparent heat dissipating plate or a transparent heat dissipating sheet) may be located between or on the panel assembly 52 and the backlight unit 56 as needed.

The backlight unit 56 forms a plurality of pixels in columns and rows (the directions of the Y-axis and the X-axis, respectively). The number of pixels formed by the backlight unit 56 may be less than the number of pixels formed by the panel assembly 52, that is, one of the pixels of the backlight unit 56 may correspond to a plurality of the pixels of the panel assembly 52. Each of the pixels of the backlight unit 56 is able to display a gray scale corresponding to the highest gray scale of the corresponding pixels of the panel assembly 52. The backlight unit 56 is able to display a gray scale of 2 to 8 bits for each of the pixels thereof, but is not limited thereto.

To aid in the following description, the pixels of the panel assembly 52 are referred to as first pixels 62, the pixels of the backlight unit 56 are referred to as second pixels 66, and one of the groupings of the first pixels 62 corresponding to one of the second pixels 66 is referred to as a first pixel group.

Driving of the backlight unit 56 is performed in the following manner. A signal controller 54 for controlling the panel assembly 52 detects a highest gray scale of the first pixels 62 of the first pixel group, determines a gray scale required for light illumination of the second pixel 66 according to the detected gray scale, converts this gray scale into a digital signal, and generates a drive signal for the backlight unit 56 using this digital signal. Accordingly, the second pixels 66 of the backlight unit 56 are synchronized with the corresponding first pixels 62 in the first pixel groups when the first pixels 62 display images. The second pixels 66 provide light or illumination at predetermined gray scales to correspond to the image displayed by the first pixels 62.

As described above, to aid in the description, the "row" direction may be designated as a horizontal direction (the direction of the X-axis) of a screen formed with the panel assembly 52, and the "column" direction may be designated as a vertical direction (the direction of the Y-axis) of the screen formed with the panel assembly 52.

The panel assembly 52 may include 240 or more pixels in the row direction and the column direction, and the backlight unit 56 may include between 2 and 99 pixels in the row direction and column direction. However, the panel assembly 52 and the backlight unit 56 are not limited thereto such that the panel assembly 52 and the backlight unit 56 may have the same number of pixels. Both the panel assembly 52 and the backlight unit 56 may comprise over one thousand up to several thousand pixels in the row direction and the column direction.

The backlight unit 56 is a self-emissive display panel having a preferable resolution in the range of 2×2 to 99×99, and the emission intensity of the pixels may be independently controlled such that light of a suitable intensity may be supplied to the pixels of the panel assembly 52 corresponding to each of the pixels of the backlight unit 56. Accordingly, the display device 50 of this embodiment is able to increase the dynamic contrast ratio of the screen to thereby realize a sharper picture quality.

In the light emission device according to aspects of the present invention, the heat dissipating sheet including the carbon nanotubes is disposed on the second substrate such that the temperature of the substrate is uniformly distributed, thereby preventing heat from being concentrated at specific locations of the substrate. This also makes it unnecessary to include a separate diffusion plate for dispersing light emitted from the phosphor layer in a forward direction in the configuration of the light emission device.

Further, the display device including the above light emission device increases screen contrast and dynamic contrast ratio such that display quality is enhanced, and power consumption of the backlight unit is reduced to thereby minimize overall power consumption, ultimately making manufacture of large displays of 30 inches or greater more feasible.

Although a few embodiments of the present invention have been shown and described, it would be appreciated by those skilled in the art that changes may be made in these embodiments, without departing from the principles and spirit of the invention, the scope of which is defined in the claims and their equivalents, such as providing cooling fins or channels in other areas of the cooling plate and heat dissipating sheet, producing the cooling plate of the same material as the heat dissipating sheet, including other heat conductive, transparent polymers with carbon nanotubes dispose therein, and including other carbon nanostructures.

What is claimed is:

1. A light emission device, comprising:
   first and second substrates opposing each other to form a vacuum vessel;
   an electron emission unit disposed on the first substrate;
   a light emission unit disposed on the second substrate, to emit visible light in response to electrons emitted from the electron emission unit;
   a heat dissipating sheet disposed on an outer surface of the second substrate, to transmit and disperse the light emitted from the light emission unit, the heat dissipating sheet comprising carbon nanotubes; and a cooling plate located on a bottom surface of the first substrate, wherein the heat dissipating sheet is connected to the cooling plate.

2. The device of claim 1, wherein the heat dissipating sheet further comprises a transparent polymer in which the carbon nanotubes are dispersed.

3. The device of claim 2, wherein the transparent polymer is selected from the group consisting of a polyacrylate, a polyethylene, a polyethylene terephthalate, and a polychloride (PC), or a combination thereof.

4. The device of claim 2, wherein the carbon nanotubes have diameters between 1 and 100 nm.

5. The device of claim 2, wherein the heat dissipating sheet has a transparency of 10% or greater.

6. The device of claim 1, wherein the heat dissipating sheet is a film adhered to the second substrate.

7. The device of claim 1, wherein the heat dissipating sheet is coated on the second substrate.

8. The device of claim 1, wherein the electron emission unit comprises:
   first electrodes formed to extend in a first direction;
   second electrodes formed to extend in a second direction; and
   electron emission regions electrically connected to the first electrodes or the second electrodes,
   wherein the first and second directions intersect, and the first electrodes are electrically insulated from the second electrodes.

9. A display device, comprising:
   a light emission device, comprising:
      first and second substrates opposing each other to form a vacuum vessel;
      an electron emission unit disposed on the first substrate;
      a light emission unit disposed on the second substrate and emitting visible light in response to electrons emitted from the electron emission unit;
      a heat dissipating sheet formed on an outer surface of the second substrate,
      wherein the heat dissipating sheet transmits and disperses the light emitted from the light emission unit and comprises carbon nanotubes; and
      a cooling plate located on a bottom surface of the first substrate, wherein the heat dissipating sheet is connected to the cooling plate; and
   a panel assembly located in front of the light emission device to transmit therethrough the light emitted from the light emission device to display images.

10. The device of claim 9, wherein the panel assembly comprises first pixels and the light emission device comprises second pixels,
   wherein a number of the second pixels is less than a number of the first pixels.

11. The device of claim 1, wherein the carbon nanotubes are aligned in a direction.

12. The device of claim 1, wherein the cooling plate further comprises cooling fins or cooling channels.

13. The device of claim 1, further comprising conductive connectors to connect the cooling plate to the heat dissipating sheet.

14. The device of claim 13, wherein the conductive connectors are disposed in an inactive area of the light emission device.

15. The device of claim 13, wherein the conductive connectors further comprise cooling fins or cooling channels.

* * * * *